(12) United States Patent
Toko et al.

(10) Patent No.: US 12,216,361 B2
(45) Date of Patent: Feb. 4, 2025

(54) LIQUID CRYSTAL ELEMENT, LIGHTING APPARATUS, AND VEHICLE LAMP SYSTEM

(71) Applicant: STANLEY ELECTRIC CO., LTD., Tokyo (JP)

(72) Inventors: Yasuo Toko, Tokyo (JP); Satomi Suzuki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/626,020

(22) Filed: Apr. 3, 2024

(65) Prior Publication Data

US 2024/0337879 A1 Oct. 10, 2024

(30) Foreign Application Priority Data

Apr. 7, 2023 (JP) ................. 2023-062653

(51) Int. Cl.
*G02F 1/1337* (2006.01)
*F21S 41/64* (2018.01)
*F21W 102/20* (2018.01)

(52) U.S. Cl.
CPC ...... *G02F 1/133711* (2013.01); *F21S 41/645* (2018.01); *G02F 1/133746* (2021.01); *F21W 2102/20* (2018.01)

(58) Field of Classification Search
CPC .......... G02F 1/133711; G02F 1/133746; F21S 41/645; F21W 2102/20
See application file for complete search history.

(56) References Cited

FOREIGN PATENT DOCUMENTS

JP S63106624 A 5/1988

*Primary Examiner* — Donald L Raleigh
(74) *Attorney, Agent, or Firm* — Holtz, Holtz & Volek PC

(57) ABSTRACT

To provide a liquid crystal element having multiple alignment domains with a simple configuration. The liquid crystal element includes: a first and a second substrate; a liquid crystal layer inbetween the two substrates; and a seal material with an injection port; where a first and a second alignment film each has an alignment regulating force in one direction on a surface in contact with the liquid crystal layer, a polymerized monomer is present at the interface between each of the two alignment films and the liquid crystal layer; the liquid crystal layer has a first region close to the injection port and a second region far from the injection port; and the first region has a high polymer density and has a pretilt angle in a direction opposite to the alignment regulating force, and the second region has a pretilt angle in the same direction as the alignment regulating force.

12 Claims, 6 Drawing Sheets

LIQUID CRYSTAL ELEMENT, LIGHTING APPARATUS, AND VEHICLE LAMP SYSTEM

BACKGROUND

Technical Field

The present disclosure relates to a liquid crystal element, a lighting apparatus, and a vehicle lamp system.

Description of the Background Art

As one method for improving the viewing angle dependency of a liquid crystal element, a method using a plurality of alignment domains having different viewing angle characteristics is known (For example, refer to Japanese Unexamined Patent Application Publication No. Sho63-106624). According to this method, it is possible to change the viewing direction for each domain, and the viewing angle dependency of the liquid crystal element as a whole is improved.

However, there is room for improvement in that forming a plurality of alignment domains generally tends to complicate the manufacturing process.

In a specific aspect, it is an object of the present disclosure is to provide a liquid crystal element or the like having a plurality of alignment domains with a simple configuration.

SUMMARY (1) A liquid crystal element according to one aspect of the present disclosure is a liquid crystal element including: (a) a first substrate and a second substrate arranged to face each other; (b) a first alignment film disposed on a side of the first substrate facing the second substrate; (c) a second alignment film disposed on a side of the second substrate facing the first substrate; (d) a liquid crystal layer disposed between the first substrate and the second substrate; and (e) a seal material disposed between the first substrate and the second substrate surrounding the liquid crystal layer, and has an injection port which is partially open; (f) where the first alignment film and second alignment film each has an alignment regulating force in one direction on a surface in contact with the liquid crystal layer, (g) where, at each of an interface between the first alignment film and the liquid crystal layer and an interface between the second alignment film and the liquid crystal layer, a polymerizable monomer by light irradiation or a polymer obtained by polymerizing the monomer is present, (h) where the liquid crystal layer has a first region relatively close to the injection port and a second region relatively far from the injection port in a plane view, and (i) where the first region has a higher density of the polymer than the second region and has a pretilt angle in a direction opposite to the direction of the alignment regulating force, and the second region has a pretilt angle in the same direction as the direction of the alignment regulating force.

(2) A lighting apparatus according to one aspect of the present disclosure is a lighting apparatus including: (a) a liquid crystal element according to the above-described (1); (b) a light source; (c) an optical member that condenses a light emitted from the light source and causes the light to enter the liquid crystal element; and (d) a pair of polarizers arranged opposite to each other with the liquid crystal element in between.

(3) A vehicle lamp system according to one aspect of the present disclosure is a vehicle lamp system configured to include the lighting apparatus according to the above-described (2).

According to the above configurations, it is possible to provide a liquid crystal element having a plurality of alignment domains with a simple configuration, and a lighting apparatus and a vehicle lamp system including the liquid crystal element.

DESCRIPTION OF THE PREFERRED EMBODIMENTS

Figure 1A:
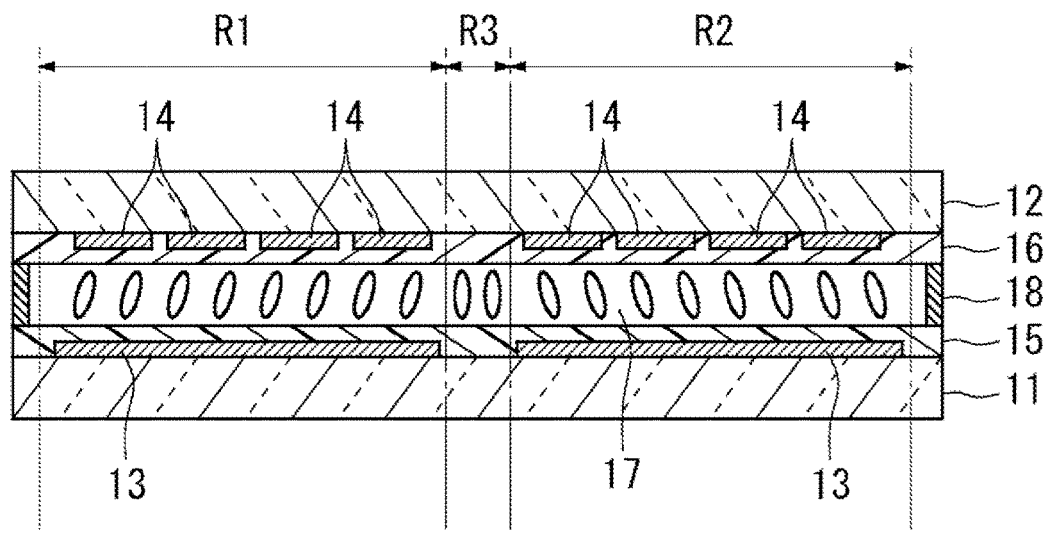
FIG. 1A is a schematic cross-sectional view showing the configuration of a liquid crystal element of one embodiment.
Figure 1B:
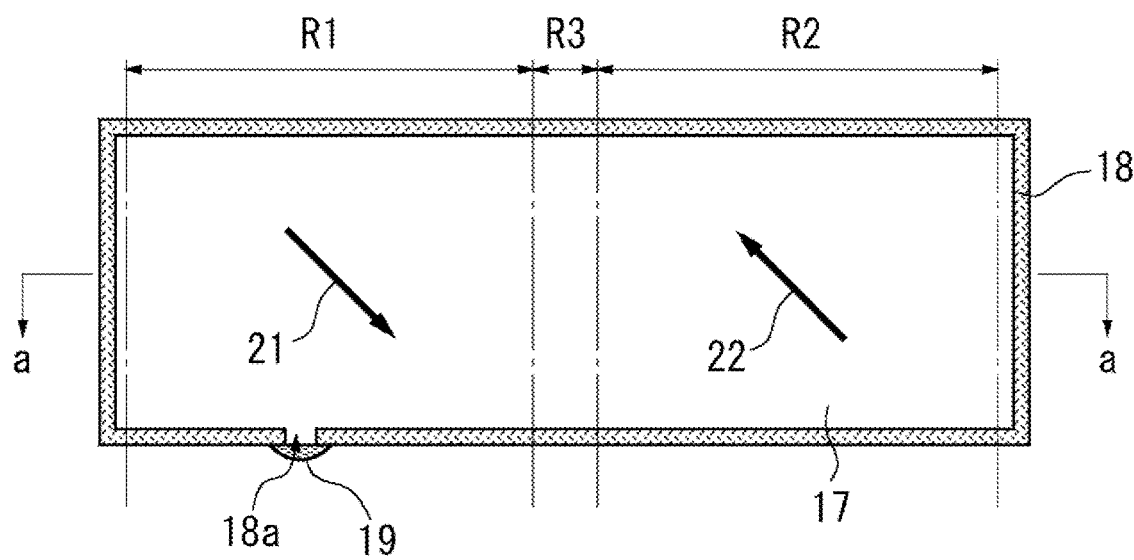
FIG. 1B is a schematic plane view showing the configuration of a liquid crystal element.

FIG. 1A is a schematic cross-sectional view showing the configuration of a liquid crystal element of one embodiment. Further, FIG. 1B is a schematic plane view showing the configuration of the liquid crystal element. The cross-sectional view shown in FIG. 1A corresponds to the cross-section taken along the a-a line shown in FIG. 1B. The liquid crystal element 1 shown in each figure is configured to include a first substrate 11 and a second substrate 12 arranged to face each other, a plurality of common electrodes 13, a plurality of pixel electrodes (counter electrodes) 14, alignment films 15 and 16, a liquid crystal layer 17, and a seal material 18.

The first substrate 11 and the second substrate 12 are each rectangular substrates in a plane view, for example, and are arranged to face each other. As each substrate, a transparent substrate such as a glass substrate or a plastic substrate can be used. Between the first substrate 11 and the second substrate 12, spherical spacers (not shown) made of resin film are distributed, and these spherical spacers maintain a gap between the substrates at a desired size (for example, on the order of several μm). Here, note that instead of the spherical spacers, a plurality of columnar bodies made of resin or the like may be provided on the first substrate 11 side or the second substrate 12 side, and these may be used as spacers.

Each common electrode 13 is provided on one side of the first substrate 11 that faces the second substrate 12. These common electrodes 13 are formed by appropriately patterning a transparent conductive film such as indium tin oxide (ITO). In this embodiment, one common electrode 13 is provided corresponding to each of regions R1 and R2, and each common electrode 13 is arranged to face each pixel electrode 14 arranged in regions R1 and R2. A common electrode 13 is not arranged in region R3. Here, note that one common electrode may be provided which is arranged across region R1 and region R2. In this case, as a result, a common electrode is also arranged in region R3.

Each pixel electrode 14 is provided on one side of the second substrate 12 that faces the first substrate 11. These pixel electrodes 14 are formed by appropriately patterning a transparent conductive film such as indium tin oxide (ITO). A pixel portion is formed in each opposing portion of each pixel electrode 14 and common electrode 13. Each pixel electrode 14 is arranged in region R1 and region R2, but not in region R3.

The alignment film (first alignment film) 15 is provided on one surface side of the first substrate 11 so as to cover each common electrode 13. Similarly, the alignment film (second alignment film) 16 is provided on one side of the second substrate 12 so as to cover each pixel electrode 14. As each of the alignment films 15 and 16, a vertical alignment film which regulates the alignment state of the liquid crystal layer 17 to a substantially vertical alignment is used, for example. Each of the alignment films 15 and 16 is subjected to a uniaxial alignment process such as a rubbing process, and has an alignment regulating force in one direction that defines the alignment of liquid crystal molecules in the liquid crystal layer 17. The directions of the alignment treatment on each of the alignment films 15 and 16 are set to be alternate (anti-parallel), for example. Although there is no particular limitation regarding the material of each of the alignment films 15 and 16, it is preferable to use an inorganic alignment film such as a siloxane-based vertical alignment film. Depending on the material and rubbing conditions, each of the alignment films 15 and 16 preferably exhibits a pretilt angle of 89.4° or more with respect to the liquid crystal molecules of the liquid crystal layer 17 before the ultraviolet irradiation treatment which is to be described later.

The liquid crystal layer 17 is provided between the first substrate 11 and the second substrate 12. In this embodiment, the liquid crystal layer 17 is formed by using a nematic liquid crystal material having negative dielectric anisotropy ac, the liquid crystal material including a chiral material, and having fluidity. In the liquid crystal layer 17 of this embodiment, the alignment direction of liquid crystal molecules is tilted in one direction when no voltage is applied, and has a pretilt angle within a range of 85° or more and less than 90° with respect to each substrate surface, for example, and the alignment is set to be approximately vertical.

The seal material 18 which seals the liquid crystal layer 17 is provided between the first substrate 11 and the second substrate 12 so as to surround the liquid crystal layer 17. As shown in FIG. 1B, the seal material 18 is provided in an annular shape between the first substrate 11 and the second substrate 12. The seal material 18 has an injection port 18a, which is provided by opening a part of the seal material. The injection port 18a is for injecting liquid crystal material between the first substrate 11 and the second substrate 12 during manufacturing of the liquid crystal element 1. The injection port 18a is sealed with an end seal material 19.

Here, the liquid crystal element 1 of this embodiment has three regions R1, R2, and R3 within an effective region which is the inner side surrounded by the seal material 18. As shown in FIG. 1B, region R1 is the region relatively close to the injection port 18a, region R2 is the region relatively far from the injection port 18a, and region R3 is the region which exists between region R1 and region R2.

In this embodiment, the pretilt angles of the liquid crystal layer 17 are different in each of regions R1 and R2. Specifically, in FIG. 1A, when a pretilt angle is defined clockwise in the figure with the surface of the first substrate 11 facing the liquid crystal layer 17 as a reference (0°), then the pretilt angle of region R1 is a value larger than 90° and close to 90° (for example, 90.5°). And the pretilt angle of region R2 is a value smaller than 90° and close to 90° (for example, 89.5°). That is, the alignment domain of the liquid crystal layer 17 is different between region R1 and region R2. Here, note that the pretilt angle in region R3 is an intermediate value between the pretilt angles of region R1 and region R2.

Further, in this embodiment, viewing direction 21 in region R1 and viewing direction 22 in region R2 are opposite to each other. In the illustrated example, the viewing direction 21 of region R1 is toward the lower right in the figure, and the viewing direction 22 of region R2 is toward the upper left in the figure.

Figure 2A:
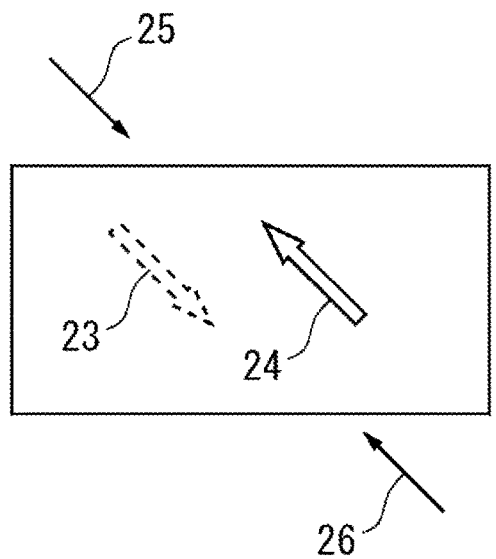
FIG. 2A is a schematic plane view of the liquid crystal element viewed from the second substrate side.

Here, "viewing direction" in this embodiment will be described. As in FIG. 2A which schematically shows a plane view of the liquid crystal element 1 viewed from the second substrate 12 side, in a case where alignment treatment direction 23 of the alignment film 15 of the first substrate 11 and alignment treatment direction 24 of the alignment film 16 of the second substrate 12 are anti-parallel alignment, a direction 25 which substantially coincides with the alignment treatment direction 23 is defined as "viewing direction" (best viewing direction). Further, a direction 26 which is opposite to the direction 25 is defined as reverse viewing direction.

Figure 2B:
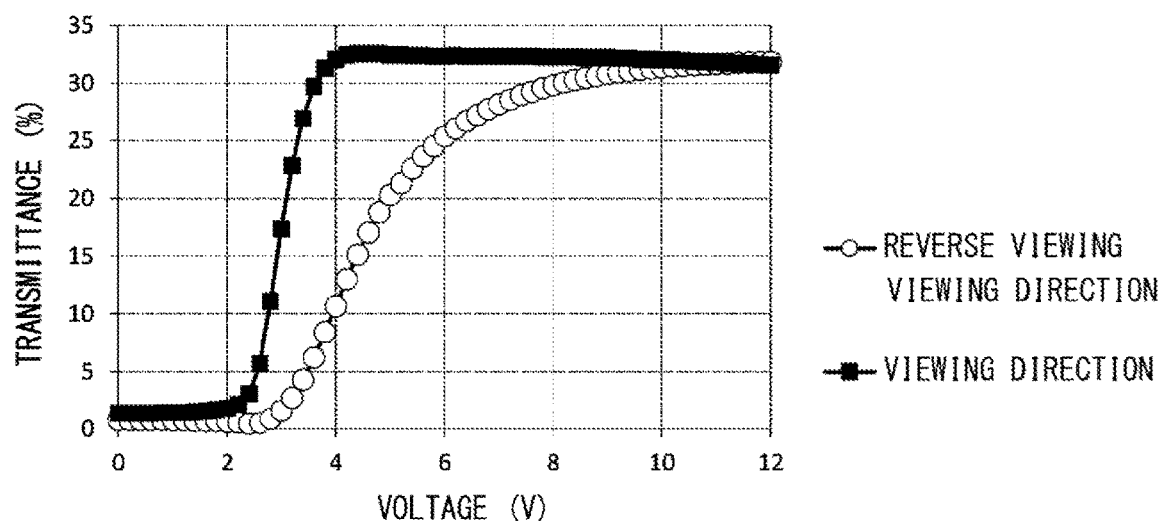
FIG. 2B is a graph illustrating electro-optical characteristics of a vertically aligned liquid crystal element measured in directions of ±20° with respect to the polar angle direction as the viewing direction and the reverse viewing direction.

FIG. 2B illustrates electro-optical characteristics of a vertically aligned liquid crystal element measured in directions of ±20° with respect to polar angle direction as the viewing direction and the reverse viewing direction. As exemplified in the figure, there is generally a difference in transmittance between the viewing direction and the reverse viewing direction, and this tendency is particularly noticeable in so-called halftone voltage range. For example, looking at transmittance when voltage of 4V is applied, the transmittance is about 32% in the viewing direction, while it is about 10% in the reverse viewing direction. That is, in other words, in a liquid crystal element, transmittance characteristics is different depending on whether light is incident from the viewing direction or a direction close thereto or whether light is incident from the reverse viewing direction or a direction close thereto.

As described above, in order to obtain the liquid crystal element 1 in which pretilt angles are different in region R1 and region R2 and the viewing direction (as well as the reverse viewing direction) is also different accordingly, the following manufacturing method can be used, for example.

A pair of transparent substrates as a first substrate 11 and a second substrate 12 are prepared, and patterned transparent electrodes (each common electrode 13, each pixel electrode 14) are formed on one surface (opposing surface) of each transparent substrate. A TFT or a color filter may be formed on each substrate.

Next, an alignment film is formed on each transparent substrate. Although a vertical alignment film is formed by flexographic printing here, it may also be formed by inkjet or the like. After the alignment film is formed, heat treatment is performed at a predetermined temperature, and rubbing treatment is further performed as uniaxial alignment treatment. There are no particular limitations on the heat treatment conditions and the rubbing treatment conditions, and known conditions can be selected as appropriate.

Thereafter, the seal material 18 is printed, gap control agent is sprayed, the pair of transparent substrates are stacked, and baking of the seal material 18 is performed (press baking). Here, note that resin spacers may be used instead of the gap control agent. Further, an injection port 18a which is an opening is provided at a part of the seal material 18. This is provided for vacuum injection of liquid crystal material. After baking the seal material 18, liquid crystal material is vacuum injected between the pair of transparent substrates using an injector.

Here, as the liquid crystal material in this embodiment, liquid crystal material with negative dielectric anisotropy, to which about 0.1 wt % of Reactive Mesogen agent (hereinafter referred to as RM agent) is added, can be used. After the liquid crystal material is injected, the entire surface of the liquid crystal material is irradiated with ultraviolet rays through either one of the pair of transparent substrates while no voltage is applied to the liquid crystal layer. The direction of irradiation of ultraviolet rays at this time does not matter. For example, there is no particular need to take measures such as irradiating from an oblique direction, and there is no need to use parallel light. Furthermore, by applying no voltage to the liquid crystal layer during ultraviolet irradiation or applying a voltage lower than a threshold voltage, the liquid crystal molecules come to have a pretilt in the direction opposite to the alignment regulating force of the alignment film. Here, note that if a voltage equal to or higher than the threshold voltage is applied during ultraviolet irradiation, the liquid crystal molecules cannot be reversed so as to have a pretilt in the direction opposite to the alignment regulating force by the alignment film.

After irradiating the liquid crystal material with ultraviolet rays, an end seal material is applied to the injection port 18a of the seal material 18, and is cured by irradiating ultraviolet rays. Here, note that an end seal material may be applied before irradiating the liquid crystal material with ultraviolet rays. In this case, the end seal material can also be cured by irradiating the liquid crystal material with ultraviolet rays, thereby simplifying the process. Through the above process, the liquid crystal element 1 is completed. Furthermore, it is possible to irradiate the liquid crystal layer with a first ultraviolet rays with no voltage being applied to, and then to irradiate the liquid crystal layer with a second ultraviolet ray with a voltage being applied to. As a result, the pretilt angle can be controlled while maintaining the direction in which the pretilt angle of the liquid crystal molecules is inclined.

Here, in this embodiment, the RM agent added to the liquid crystal material which satisfies the conditions as described below is used. As a result, in the liquid crystal element 1 obtained through the manufacturing method as described above, it is possible to provide regions R1 and R2 having different pretilt angles from each other.

Figure 3:
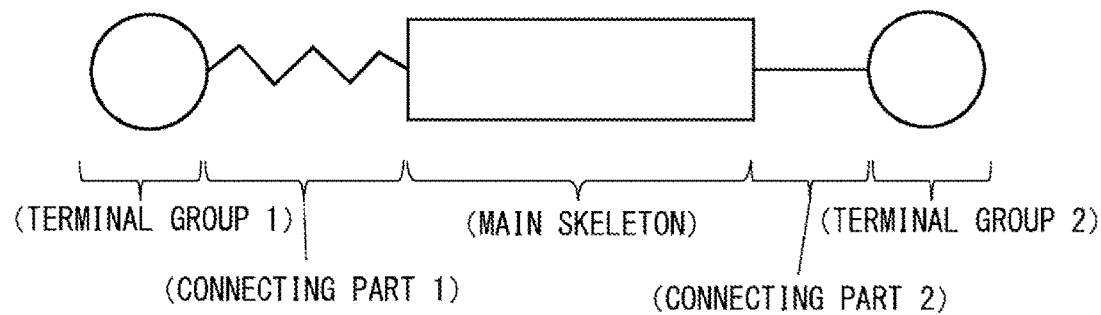
FIG. 3 is a diagram showing a structural model of a RM agent.

After studying various RM agents, the inventors of the present application have found suitable conditions for the RM agent which can obtain different pretilt angles in region R1 which is relatively close to the injection port 18a and region R2 which is relatively far from the injection port 18a. Its characteristic features will be described below with reference to a structural model shown in FIG. 3. Further, examples of the RM agents having the below-described characteristics include;

2-Propenoic acid, 2-methyl-,2'-fluoro-4"-[3-[(2-methyl-1-oxo-2-propen-1-yl)oxy]propyl][1,1': 4',1"-terphenyl]-4-yl ester (CAS Registry Number: 1299463-48-1);

2-Propenoic acid, 2-methyl-, 4"-[3-[(2-methyl-1-oxo-2-propen-1-yl)oxy]propyl][1,1': 4',1"-terphenyl]-4-yl ester;

2-Propenoic acid, 3-[4'-[(1-oxo-2-propen-1-yl)oxy][1,1'-biphenyl]-4-yl]propyl ester (CAS Registry Number: 1422344-81-7);

2-Propenoic acid, 3-[7-[(1-oxo-2-propen-1-yl)oxy]-2-phenanthrenyl]propyl ester (CAS Registry Number: 1422344-87-3); and 2-Propenoic acid, 1,1'-(2'-fluoro[1,1': 4',1"-terphenyl]-4,4"-diyl)ester (CAS Registry Number: 1422344-90-8).

(Characteristic Feature 1)

At least one of terminal groups 1 and 2 is a photopolymerizable site such as acrylate or methacrylate. The other terminal group may be an alkyl group such as a methyl group, but it is more preferable that both sides of the terminal group are photopolymerizable sites. Here, note that an RM agent including a photopolymerizable site on only one terminal group and an RM agent including photopolymerizable sites on both sides of the terminal group may be used in combination.

(Characteristic Feature 2)

At least one of connecting parts 1 and 2 which is a site connecting the main skeleton and each of the terminal groups 1 and 2 is a flexible site such as an alkyl chain. That is, in a molecular formula CxH2x, at least one of the connecting parts is preferably an alkyl chain in which x is 3 or more, more preferably 3 or more and 5 or less. Furthermore, if x of the terminal group on one side (for example, connecting part 1) is 3 or more, then the main skeleton and the terminal group on the other side (for example, connecting part 2) may be directly connected (i.e., connecting part 2 is not necessary).

(Characteristic Feature 3)

The main skeleton has a two or more rings (more preferably, three or more rings). Furthermore, some of the hydrogen may be substituted with fluorine or the like, or a fluorine substituent or the like may be introduced. The main skeleton is more preferably a benzene ring having two or more rings (more preferably three or more rings). Further, it is preferable that a fluorine group or the like is attached to a part of the benzene ring. Specifically, a phenanthrene structure and a structure in which a part of hydrogen is substituted with fluorine or the like, a terphenyl structure, a terphenyls structure (having two or more benzene rings), and a structure in which a part of hydrogen is substituted with fluorine or the like are preferred.

Figure 4A:
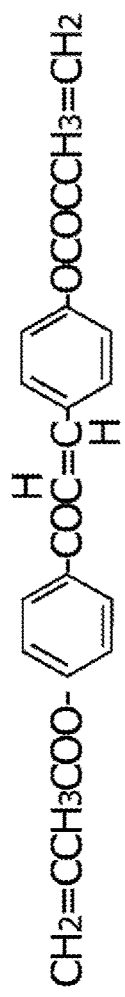
FIGS. 4A to 4C are diagrams showing chemical formulas of examples of unsuitable RM agents.
Figure 4B:
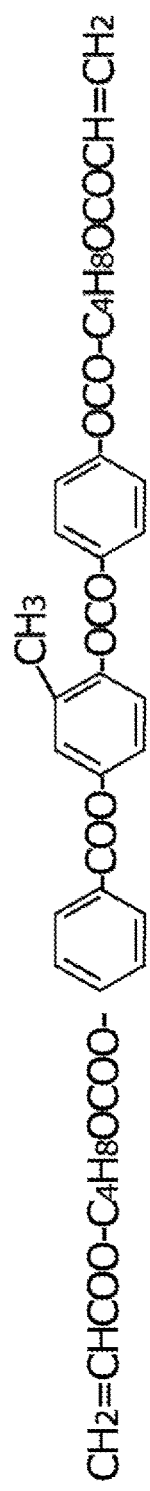
Figure 4C:
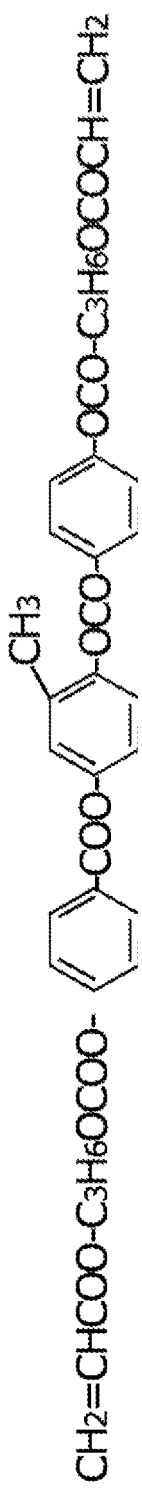

On the contrary, as described below, the inventors of the present application have found conditions for the RM agent under which different pretilt angles cannot be obtained in region R1 and region R2. The chemical formulas of examples of the RM agent which meet the following conditions are shown in FIGS. 4A to 4C.

(Characteristic Feature 1)

A symmetrical molecular structure exists.

(Characteristic Feature 2)

No flexible sites exists.

(Characteristic Feature 3)

Even if a flexible site were to exist, the three ring part (the site of a cyclic compound containing three connected rings) is also a flexible site, and there is no rigid site.

(Characteristic Feature 4)

No fluorine group exists in the ring part (methyl group is present).

(Characteristic Feature 5)

There is a tendency to become a dense polymer.

By manufacturing the liquid crystal element 1 using the RM agent under the suitable conditions described above, a pretilt angle occurs in the direction opposite to the alignment processing direction (direction of the alignment regulating force) in region R1 which is the region close to the injection port 18a. And in region R2 which is a region far from the injection port 18a, a pretilt angle occurs in the same direction as the alignment processing direction (direction of the alignment regulating force). Therefore, a two-domain alignment can be easily obtained without going through a complicated manufacturing process. That is, by shifting the position of the injection port 18a, it is possible to obtain a reverse pretilt state in region R1 which is approximately half of the liquid crystal element 1 in a plane view, and a forward pretilt state in region R2 which is approximately the remaining half of the liquid crystal element. Next, the reason why such a pretilt angles can be achieved will be described.

According to the verification conducted by the inventors of the present application, it was found that the monomer (the RM agent) has a property of being localized (adsorbed) near the interface between the liquid crystal layer and the substrate (alignment film) rather than in the bulk of the liquid crystal layer. Although it may depend on the monomer material and alignment film material, monomers are generally molecularly designed to be easily adsorbed on the alignment film interface. When a liquid crystal material to which a monomer has been added is injected by a vacuum injection method from an injection port provided at the seal material, the monomer is sequentially adsorbed to the interface from a position close to the injection port as the injection progresses. Therefore, the molecular weight of the monomer adsorbed along the alignment film interface near the injection port is large, and the molecular weight of the monomer adsorbed on the alignment film interface decreases as the distance from the injection port increases.

Then, when the concentration of the monomer in the liquid crystal layer becomes lower than a certain concentration, the phenomenon of reversing the pretilt angle cannot be obtained. Therefore, in region R1 which is close to the injection port and therefore has a relatively high monomer concentration, pretilt angle occurs in the opposite direction to the rubbing direction, and in region R2 where the monomer concentration is relatively low, pretilt angle occurs in the same direction as the rubbing direction. Here, note that region R3 is considered to have pretilt angle intermediate between regions R1 and R2, and it is considered that there may be a case where the pretilt angle is 90°. For this reason, it can be said that it is preferable not to use region R3 as a light modulation region. In other words, it is preferable not to provide a pixel portion group in region R3.

When examining the liquid crystal elements in which the concentration of RM agent added to the liquid crystal material is as low as 0.05 wt % and 0.02 wt %, it was not possible to obtain different pretilt angles in region R1 and region R2. From this result, in the liquid crystal element 1 in which different pretilt angles are obtained in region R1 and region R2, it is estimated that the concentration of the RM agent in region R1 is at least greater than 0.05 wt %, and on the other hand, in region R2, it is estimated that the concentration of the RM agent is 0.05 wt % or less.

Figure 5:
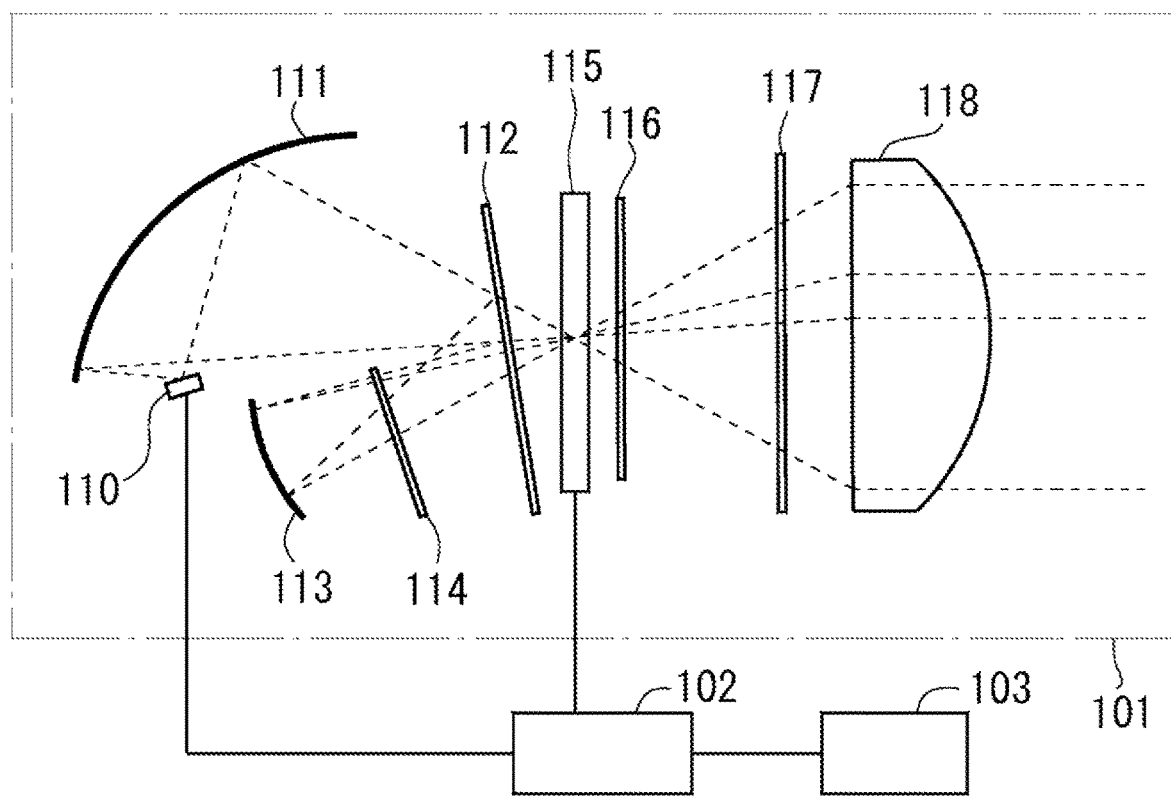
FIG. 5 is a diagram showing the configuration of a vehicle lamp system according to one embodiment.

FIG. 5 is a diagram showing the configuration of a vehicle lamp system according to one embodiment. The vehicle lamp system shown in FIG. 5 is configured using a liquid crystal element having the same configuration as the liquid crystal element 1 according to the above described embodiment, and is configured to include a vehicle lamp (a lighting apparatus) 101, a controller 102, and a camera 103. This vehicle lamp system detects positions of vehicles in front, faces of pedestrians, etc. around the own vehicle based on images taken by the camera 103, sets a certain region including the position of the vehicles in front as a non-irradiation region (a dimming region), and sets the other region as a light irradiation region and selectively irradiates light, and further irradiates light in various shapes onto the road surface.

The vehicle lamp 101 is placed at a predetermined position at the front of the vehicle, and forms irradiation light for illuminating the front of the vehicle. Here, note that, for example, although one vehicle lamp 101 is provided on each of the left and right sides of the front portion of the vehicle, only one lamp is illustrated here.

The controller 102 controls the operation of a light source 110 and a liquid crystal element 115 of the vehicle lamp 101. This controller 102 is realized by using a computer system having, for example, a CPU (Central Processing Unit), a ROM (Read Only Memory), a RAM (Random Access Memory), etc., and by executing a predetermined operating program in the computer system. The controller 102 of this embodiment turns on the light source 110 according to the operation state of a light switch (not shown) installed in the driver's seat, sets a light distribution pattern according to objects such as a forward vehicle (oncoming vehicle, preceding vehicle), a pedestrian, a road sign, a white line on the road, or the like detected by the camera 103, and provides a control signal to the liquid crystal element 115 for forming an image corresponding to the light distribution pattern.

The camera 103 photographs the space in front of the own vehicle to generate an image and performs predetermined image recognition processing on this image to determine the position, range, size, type, etc. of the object such as the forward vehicle. The detection result obtained by the image recognition process is provided to the controller 102 which is connected to the camera 103. The camera 103 is installed at a predetermined position inside the vehicle (for example, upper portion of the windshield) or at a predetermined position outside the vehicle (for example, inside the front bumper). If the vehicle is equipped with a camera for other purposes (for example, an automatic braking system, etc.), the camera may be shared.

Here, note that the function of image recognition processing of the camera 103 may be replaced by the controller 102. In this case, the camera 103 outputs the generated image to the controller 102, and image recognition processing is performed on the controller 102 side based on this image. Alternatively, both the image and the result of image recognition processing based on the image may be provided from the camera 103 to the controller 102. In this case, the controller 102 may further perform its own image recognition processing using the image obtained from the camera 103.

The vehicle lamp 101 shown in FIG. 5 is configured to include the light source 110, reflectors 111 and 113, a polarizing beam splitter 112, a quarter-wave plate 114, the liquid crystal element 115, an optical compensator 116, a polarizer 117, and a projection lens 118. Each of these elements is housed and integrated in one housing, for example. Further, the light source 110 and the liquid crystal element 115 are each connected to the controller 102.

The light source 110 emits light under the control of the controller 102. The light source 110 is configured to include several light emitting elements such as white LEDs (Light Emitting Diodes) and a drive circuit, for example. Here, note that the configuration of the light source 110 is not limited thereto. For example, the light source 110 can be a laser element, or a light source commonly used in a vehicle lamp such as a light bulb or a discharge lamp.

The reflector 111 is arranged in correspondence with the light source 110, reflects and condenses light emitted from the light source 110, guides it toward the polarizing beam splitter 112, and causes the light to enter the liquid crystal element 115. The reflector 111 is a reflecting mirror having an ellipsoidal reflecting surface, for example. In this case, the light source 110 can be placed near the focal point of the reflective surface of the reflector 111. Here, note that instead of the reflector 111, a condensing lens may be used as an optical member for condensing the light.

The polarizing beam splitter 112 is a reflective polarizing element that transmits a polarized component in a specific direction of the incident light and reflects a polarized component in a direction perpendicular to the specific direction. As such a polarizing beam splitter 112, for example, a wire grid type polarizing element, a multilayer film polarizing element, or the like can be used.

The reflector 113 is provided at a position where the light reflected by the polarizing beam splitter 112 can be incident, and reflects the incident light toward the direction of the polarizing beam splitter 112.

The quarter-wave plate 114 is placed on the optical path between the polarizing beam splitter 112 and the reflector 113, and provides a phase difference to the incident light. In this embodiment, the light reflected by the polarizing beam splitter 112 passes through the quarter-wave plate 114, is reflected by the reflector 113, and passes through the quarter-wave plate 114 again, thereby the polarization direction is rotated by 90 degrees and the light enters the polarization beam splitter 112 again. As a result, the re-entering light can pass through the polarizing beam splitter 112, thereby the light utilization efficiency is improved.

The liquid crystal element 115 is arranged at a position where the light reflected and condensed by each of the reflectors 111 and 113 can enter. The liquid crystal element 115 includes a plurality of pixel portions (light modulation portions) which can be controlled independently of each other. In this embodiment, the liquid crystal element 115 includes a driver (not shown) for applying a driving voltage to each pixel portion. The driver applies a driving voltage to the liquid crystal element 115 to individually drive each pixel portion based on a control signal provided from the controller 102. This liquid crystal element 115 has the same configuration as the liquid crystal element 1 of the embodiment described above.

The optical compensator 116 is for compensating the phase difference of the light transmitted through the liquid crystal element 115 and for increasing the degree of polarization. Here, note that the optical compensator 116 may be omitted.

The polarizer 117 is arranged on the light emitting side of the liquid crystal element 115. The polarizing beam splitter 112, the polarizer 117, and the liquid crystal element 115 disposed therebetween form an image corresponding to a light distribution pattern of the light irradiated to the front of the own vehicle.

The projection lens 118 is arranged at a position where the light reflected and condensed by the reflectors 111 and 113 and transmitted through the liquid crystal element 115, the optical compensator 116, and the polarizer 117 can enter, and projects this incident light to the front of the own vehicle. The projection lens 118 is arranged so that its focal point corresponds to the position of the liquid crystal layer of the liquid crystal element 115.

Figure 6A:
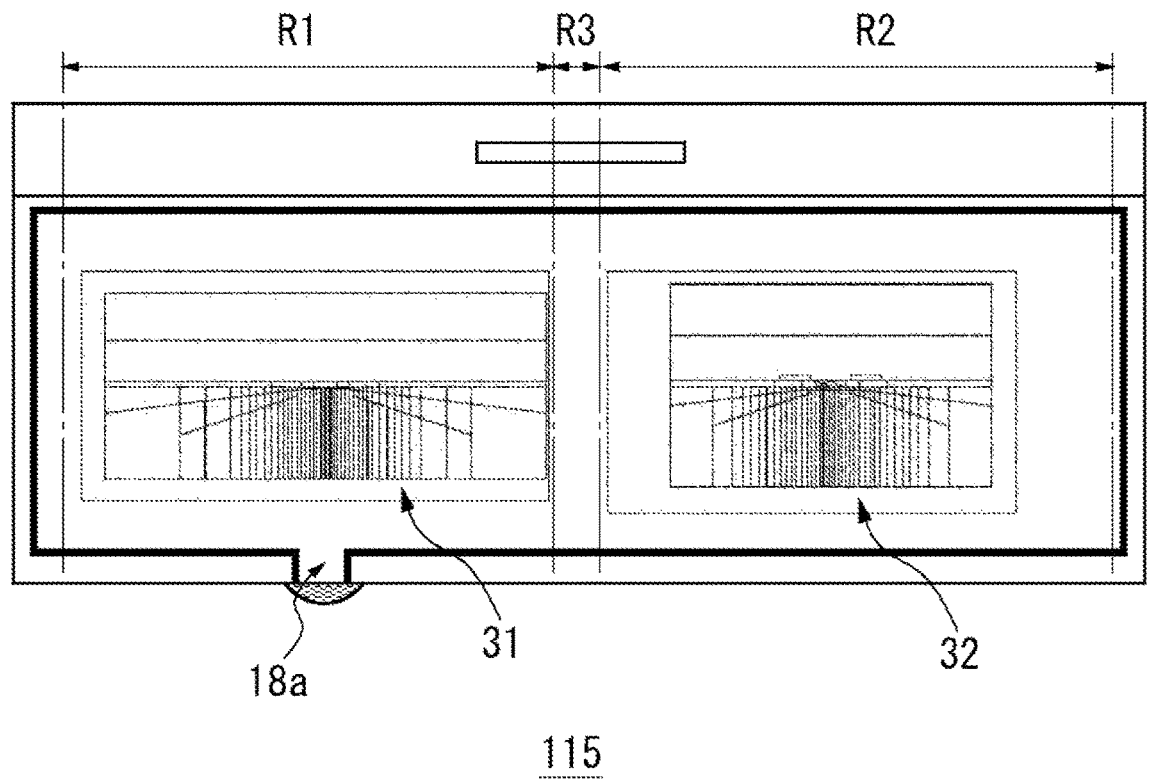
FIG. 6A is a schematic plane view showing a configuration example of a pixel portion of a liquid crystal element in a vehicle lamp system.
Figure 6B:
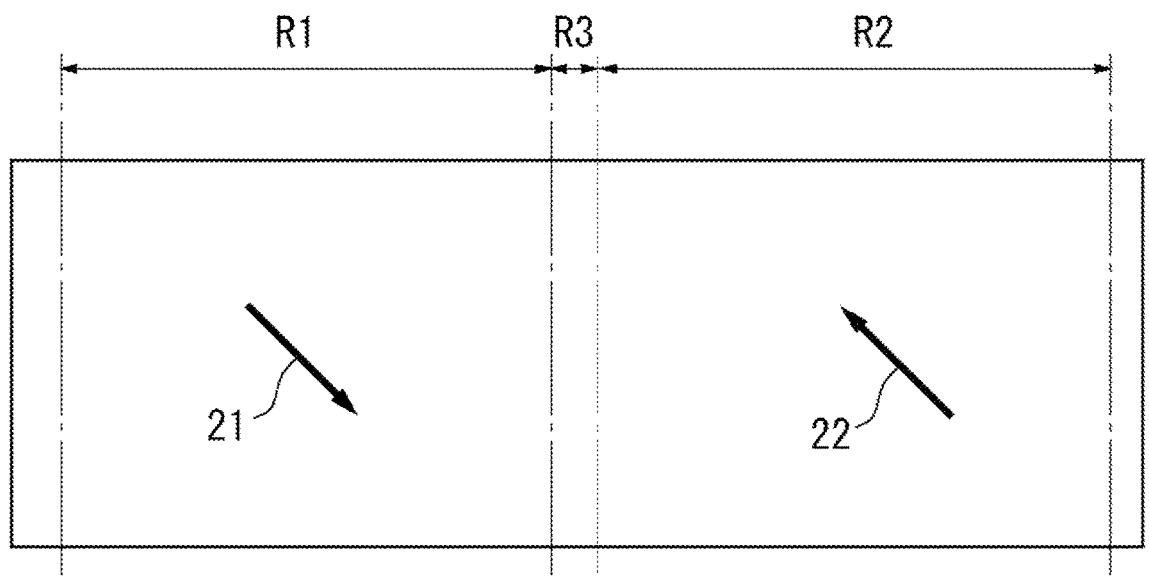
FIG. 6B is a schematic plane view for explaining viewing directions in a liquid crystal element.

FIG. 6A is a schematic plane view showing a configuration example of a pixel portion of a liquid crystal element in a vehicle lamp system. Further, FIG. 6B is a schematic plane view for explaining the viewing directions in this liquid crystal element. As shown in FIG. 6A, in the liquid crystal element 115, a pixel portion group (first pixel portion group) 31 including a plurality of pixel portions having various shapes in a plane view is provided in region R1, and a pixel portion group (second pixel portion group) 32 including a plurality of pixel portions having various shapes in a plane view is provided in region R2.

The pixel portion group 31 and the pixel portion group 32 each include a plurality of pixel electrodes 14 and a plurality of common electrodes 13 arranged to face the pixel electrodes 14 (refer to FIG. 1A). The pixel portion group 31 and the pixel portion group 32 are each driven individually. The transmitted light formed by the pixel portion group 31 and the transmitted light formed by the pixel portion group 32 are combined by the projection lens 118 to form a desired projected image (light distribution pattern) in front of the own vehicle. By overlapping at least a portion of the image projected by the pixel portion group 31 and the image projected by the pixel portion group 32, the illuminance of the light distribution pattern can also be increased. The pixel portion group 31 is arranged in region R1 near the injection port 18a of the seal material 18 and the pixel portion group 32 is arranged in region R2 far from the injection port 18a. Further, no pixel portion group is arranged in region R3. For example, lights emitted from two white LEDs included in the light source 110 enter the pixel portion group 31 and the pixel portion group 32, respectively.

As shown in FIG. 6B, viewing direction 21 of region R1 is a direction toward the lower right in the figure, and forms an angle of approximately 450 with respect to the left-right direction in the figure. Further, viewing direction 22 of region R2 is a direction toward the upper left in the figure, and forms an angle of approximately 45° with respect to the left-right direction in the figure. In this way, the viewing directions in regions R1 and R2 are anti-parallel, and the liquid crystal layer has a two-domain alignment corresponding to regions R1 and R2.

Figure 7:
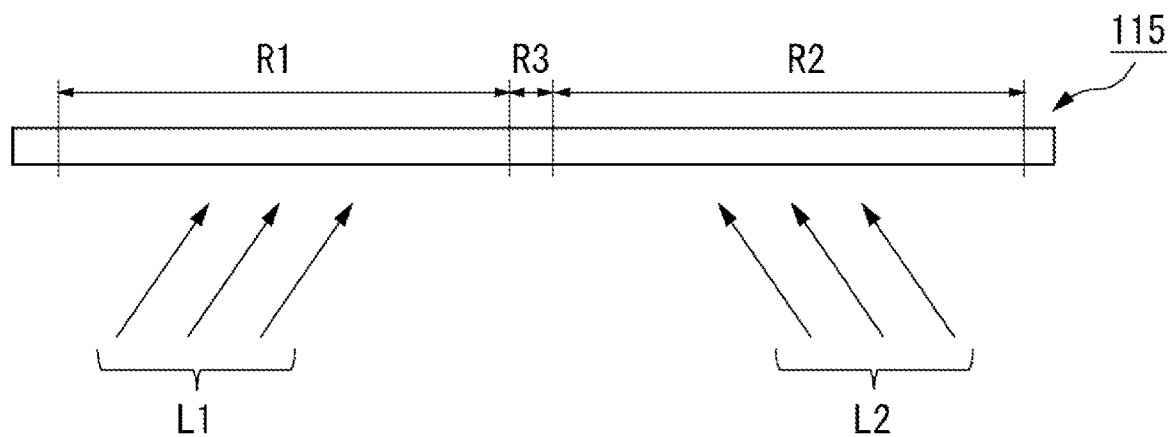
FIG. 7 is a diagram schematically showing directions of incidence of light onto a liquid crystal element.

FIG. 7 is a diagram schematically showing the directions of incidence of light to the liquid crystal element 115. FIG. 7 schematically shows how the liquid crystal element 115 is viewed from its upper end side. As shown in FIG. 7, in the vehicle lamp system of this embodiment, light emitted from the light source 110 and condensed by the reflectors 111 and 113 enters the liquid crystal element 115 from an oblique direction at a wide angle. Specifically, light L1 which enters region R1 of the liquid crystal element 115 is mainly the light that travels diagonally to the upper-right in the figure, and on the other hand, light L2 which enters region R2 of the liquid crystal element 115 is the light that mainly travels diagonally to the upper-left in the figure. Here, note that it is preferable to prevent light from entering region R3.

Here, if regions R1 and R2 were to both have the same viewing direction, the brightness of the projected image would be uneven. The reason for this is as described above with reference to FIG. 2, and is because a difference in transmittance occurs between the viewing direction and the reverse viewing direction. On the contrary, in this embodiment, since the viewing directions are opposite in each of regions R1 and R2, it is possible to reduce uneven brightness of the projected image.

According to the above-described embodiments, a liquid crystal element that can obtain a plurality of alignment domains with a simple configuration is provided. Further, by using the liquid crystal element, it is possible to obtain a vehicle lamp and a vehicle lamp system in which uneven brightness of a projected image is reduced.

Here, note that the present disclosure is not limited to the content of the embodiments described above, and can be implemented with various modifications within the scope of the gist of the present disclosure. For example, in the above description, the viewing directions are anti-parallel in regions R1 and R2, and the liquid crystal layer has a two-domain alignment corresponding to regions R1 and R2. That is, an example has been described where the boundary of the two-domain alignment exists in region 3. However, it is not necessary to provide a boundary of the two-domain alignment in region 3. It is sufficient such that the boundary is provided between the effective pixel portion group 31 in region R1 and the effective pixel portion group 32 in region R2. Further, in the above-described embodiment, a vehicle lamp is cited as an example of a lighting apparatus to which the liquid crystal element according to the present disclosure can be applied, and a vehicle lamp system is cited as an example of a system to which the vehicle lamp according to the present disclosure is applied. However, the scope of application of the liquid crystal element is not limited thereto, and the liquid crystal element of the present disclosure can be applied to various lighting apparatus or systems.

The present disclosure has features as appended below.

(Appendix 1)
A liquid crystal element including:
  a first substrate and a second substrate arranged to face each other;
  a first alignment film disposed on a side of the first substrate facing the second substrate;
  a second alignment film disposed on a side of the second substrate facing the first substrate;
  a liquid crystal layer disposed between the first substrate and the second substrate; and a seal material disposed between the first substrate and the second substrate surrounding the liquid crystal layer, and has an injection port which is partially open;
  wherein the first alignment film and second alignment film each has an alignment regulating force in one direction on a surface in contact with the liquid crystal layer,
  wherein, at each of an interface between the first alignment film and the liquid crystal layer and an interface between the second alignment film and the liquid crystal layer, a polymerizable monomer by light irradiation or a polymer obtained by polymerizing the monomer is present,
  wherein the liquid crystal layer has a first region relatively close to the injection port and a second region relatively far from the injection port in a plane view, and
  wherein the first region has a higher density of the polymer than the second region and has a pretilt angle in a direction opposite to the direction of the alignment regulating force, and the second region has a pretilt angle in the same direction as the direction of the alignment regulating force.

(Appendix 2)
The liquid crystal element according to appendix 1,
  wherein a polymerized part of the monomer is an acrylate or a methacrylate, and the monomer or the polymer has a flexible site at least on one side between a ring part and a terminal group.

(Appendix 3)
The liquid crystal element according to appendix 1 or appendix 2,
  wherein a ring part of the monomer or the polymer has a fluorine group.

(Appendix 4)
The liquid crystal element according to any one of Appendices 1 to 3,
  wherein a ring part of the monomer or the polymer has two or more rings.

(Appendix 5)
The liquid crystal element according to any one of Appendices 1 to 4,
  wherein the first alignment film and the second alignment film are siloxane-based vertical alignment films.

(Appendix 6)
The liquid crystal element according to any one of Appendices 1 to 5,
  wherein the concentration of the polymer in the first region is greater than 0.05 wt %, and the concentration of the polymer in the second region is 0.05 wt % or less.

(Appendix 7)
The liquid crystal element according to any one of Appendices 1 to 6,
  wherein the first substrate and the second substrate have a long shape in one direction,
  wherein the first region and the second region are lined up along the one direction, and
  wherein the injection port is arranged on the first region side.

(Appendix 8)
The liquid crystal element according to any one of Appendices 1 to 7,
  wherein viewing direction of the first region and viewing direction of the second region R2 are opposite to each other.

(Appendix 9)
The liquid crystal element according to any one of Appendices 1 to 8,
  wherein the alignment regulating force of each of the first alignment film and the second alignment film is applied by rubbing treatment.

(Appendix 10)
A lighting apparatus including:
  a liquid crystal element according to any one of Appendices 1 to 9;
  a light source;
  an optical member that condenses a light emitted from the light source and causes the light to enter the liquid crystal element; and
  a pair of polarizers arranged opposite to each other with the liquid crystal element in between.

(Appendix 11)
The lighting apparatus according to appendix 10,
  wherein the liquid crystal element has a first pixel portion group and a second pixel portion group each including a plurality of pixel portions,
  wherein the first pixel portion group is arranged in the first region, and the second pixel portion group is arranged in the second region, and
  wherein the light incident on each of the first region and the second region is incident from different directions.

(Appendix 12)
A vehicle lamp system configured to include the lighting apparatus according to appendix 10 or appendix 11.

The present application is based on, and claims priority from, JP Application Serial Number 2023-62653 filed on Apr. 7, 2023, the disclosure of which is hereby incorporated by reference herein in its entirety.

DESCRIPTION OF SYMBOLS

11: First substrate
12: Second substrate
13: Common electrode
14: Pixel electrode
15, 16: Alignment film
17: Liquid crystal layer
18: Seal material
18a: Injection port
19: End seal material
21, 22: Viewing direction
31, 32: Pixel portion group
R1, R2, R3: Region

What is claimed is:

1. A liquid crystal element comprising:
a first substrate and a second substrate arranged to face each other;
a first alignment film disposed on a side of the first substrate facing the second substrate;
a second alignment film disposed on a side of the second substrate facing the first substrate;
a liquid crystal layer disposed between the first substrate and the second substrate; and
a seal material disposed between the first substrate and the second substrate surrounding the liquid crystal layer, and has an injection port which is partially open;
wherein the first alignment film and second alignment film each has an alignment regulating force in one direction on a surface in contact with the liquid crystal layer,
wherein, at each of an interface between the first alignment film and the liquid crystal layer and an interface between the second alignment film and the liquid crystal layer, a polymerizable monomer by light irradiation or a polymer obtained by polymerizing the monomer is present,
wherein the liquid crystal layer has a first region relatively close to the injection port and a second region relatively far from the injection port in a plane view, and
wherein the first region has a higher density of the polymer than the second region and has a pretilt angle in a direction opposite to the direction of the alignment regulating force, and the second region has a pretilt angle in the same direction as the direction of the alignment regulating force.

2. The liquid crystal element according to claim 1,
wherein a polymerized part of the monomer is an acrylate or a methacrylate, and the monomer or the polymer has a flexible site at least on one side between a ring part and a terminal group.

3. The liquid crystal element according to claim 2,
wherein the ring part of the monomer or the polymer has a fluorine group.

4. The liquid crystal element according to claim 2,
wherein the ring part of the monomer or the polymer has two or more rings.

5. The liquid crystal element according to claim 1,
wherein the first alignment film and the second alignment film are siloxane-based vertical alignment films.

6. The liquid crystal element according to claim 1,
wherein the concentration of the polymer in the first region is greater than 0.05 wt %, and the concentration of the polymer in the second region is 0.05 wt % or less.

7. The liquid crystal element according to claim 1,
wherein the first substrate and the second substrate have a long shape in one direction,
wherein the first region and the second region are lined up along the one direction, and
wherein the injection port is arranged on the first region side.

8. The liquid crystal element according to claim 1,
wherein viewing direction of the first region and viewing direction of the second region R2 are opposite to each other.

9. The liquid crystal element according to claim 1,
wherein the alignment regulating force of each of the first alignment film and the second alignment film is applied by rubbing treatment.

10. A lighting apparatus comprising:
a liquid crystal element according to claim 1;
a light source;
an optical member that condenses a light emitted from the light source and causes the light to enter the liquid crystal element; and
a pair of polarizers arranged opposite to each other with the liquid crystal element in between.

11. The lighting apparatus according to claim 10,
wherein the liquid crystal element has a first pixel portion group and a second pixel portion group each including a plurality of pixel portions,
wherein the first pixel portion group is arranged in the first region, and the second pixel portion group is arranged in the second region, and
wherein the light incident on each of the first region and the second region is incident from different directions.

12. A vehicle lamp system configured to comprise the lighting apparatus according to claim 10.

* * * * *